April 6, 1954     C. P. LILJENGREN ET AL     2,674,300
UPENDING SEAT CONSTRUCTION FOR VEHICLES
Filed Sept. 2, 1948     8 Sheets-Sheet 1

C. P. Liljengren
E. R. McGregor
INVENTORS

BY Albert H. Kirchner
Attorney

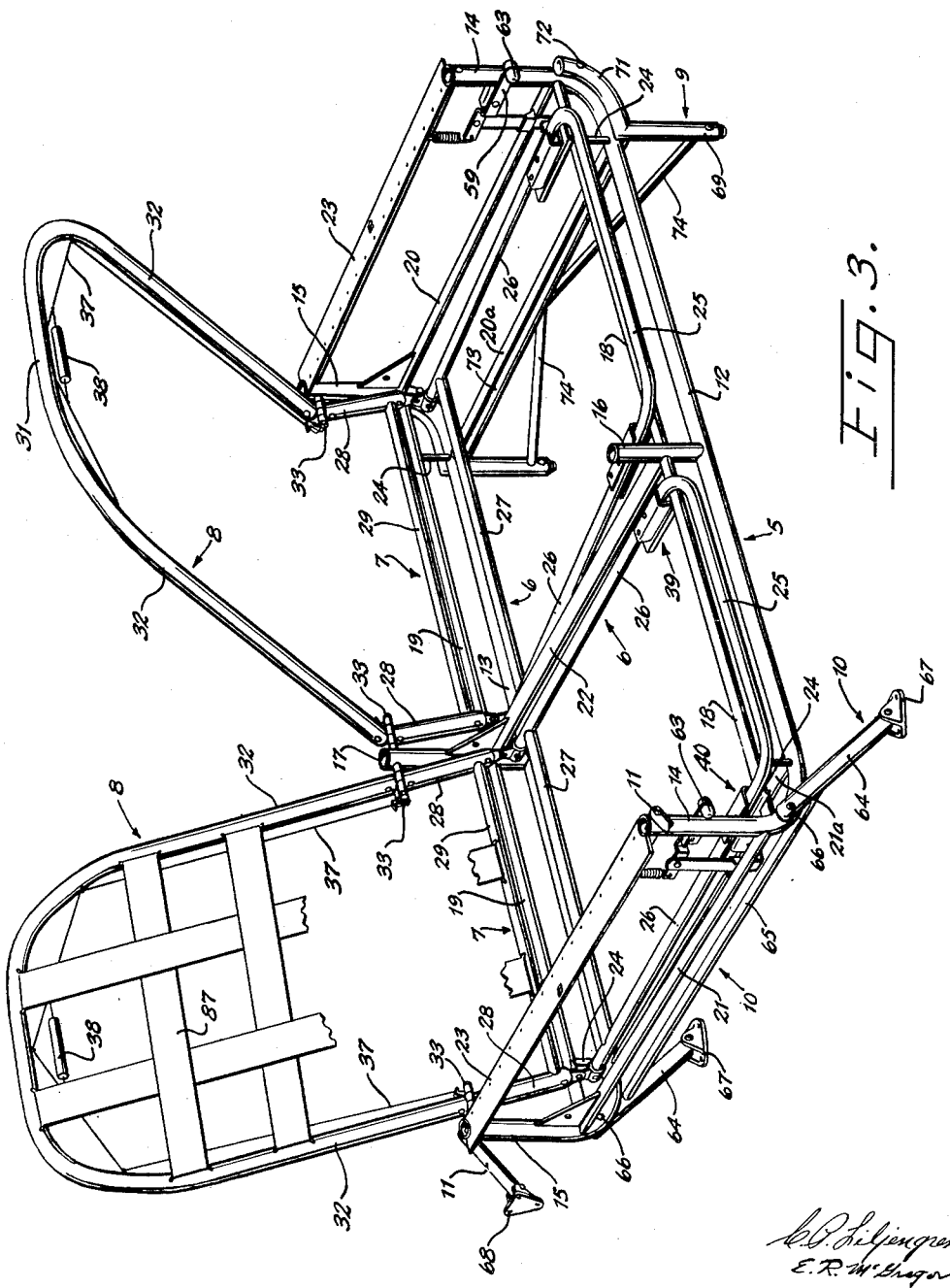

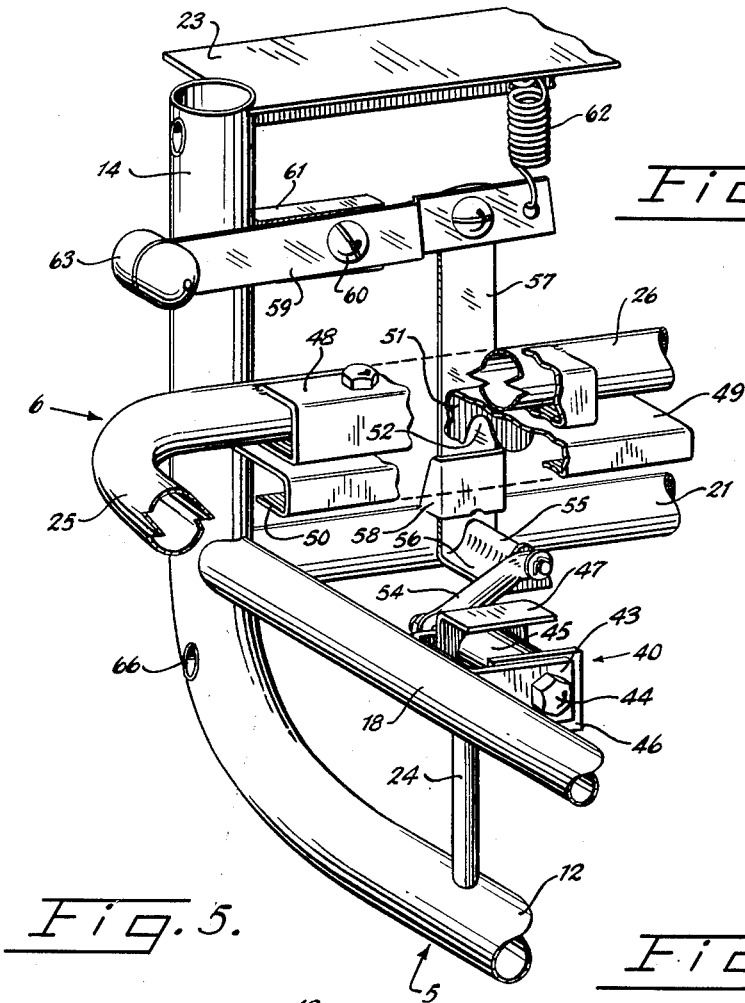
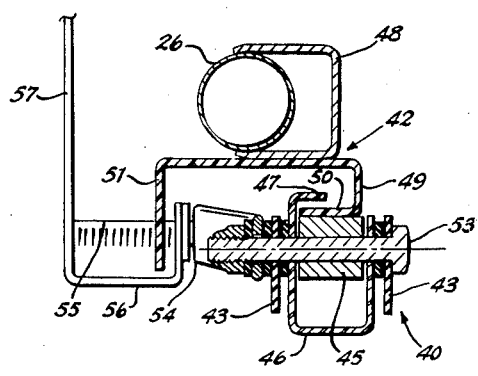
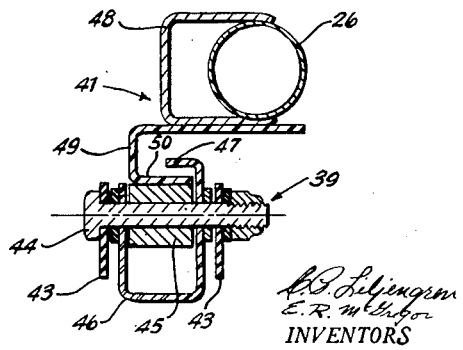

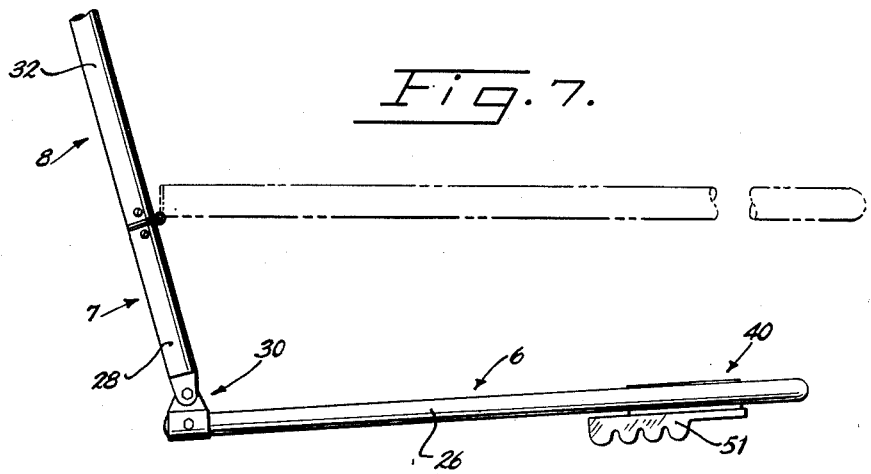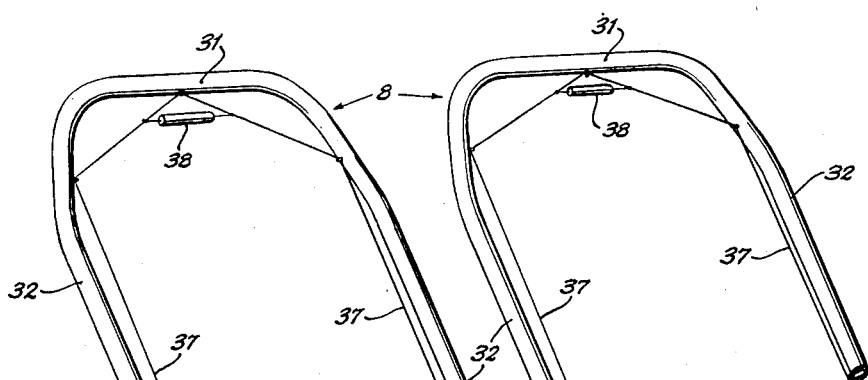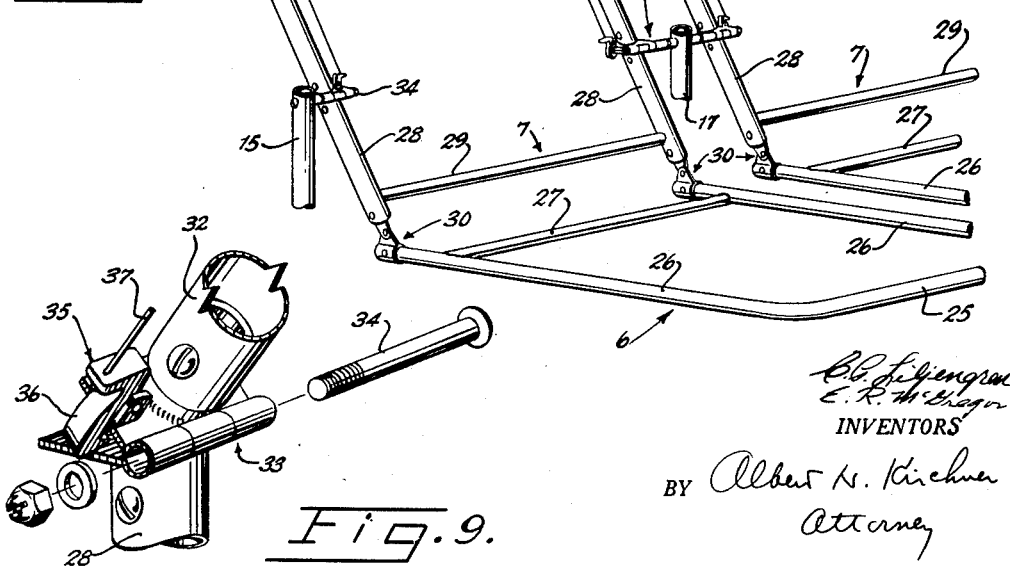

April 6, 1954  C. P. LILJENGREN ET AL  2,674,300
UPENDING SEAT CONSTRUCTION FOR VEHICLES
Filed Sept. 2, 1948  8 Sheets-Sheet 6

C. P. Liljengren
E. R. McGregor
Inventors

By Albert N. Kirchner
Attorney

April 6, 1954
C. P. LILJENGREN ET AL
2,674,300
UPENDING SEAT CONSTRUCTION FOR VEHICLES
Filed Sept. 2, 1948
8 Sheets-Sheet 7
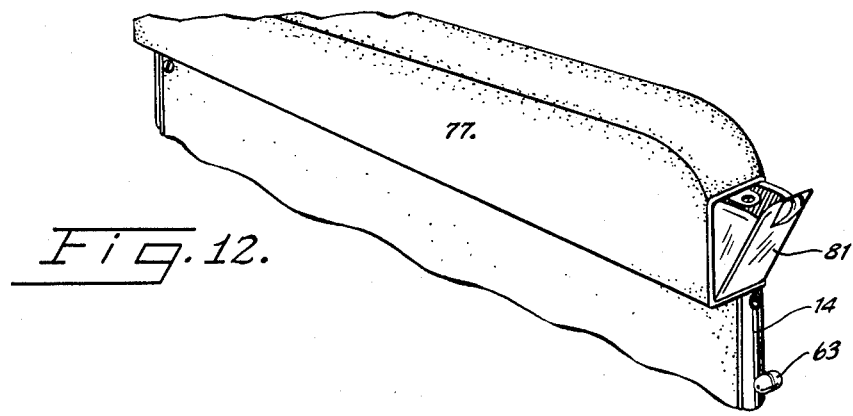
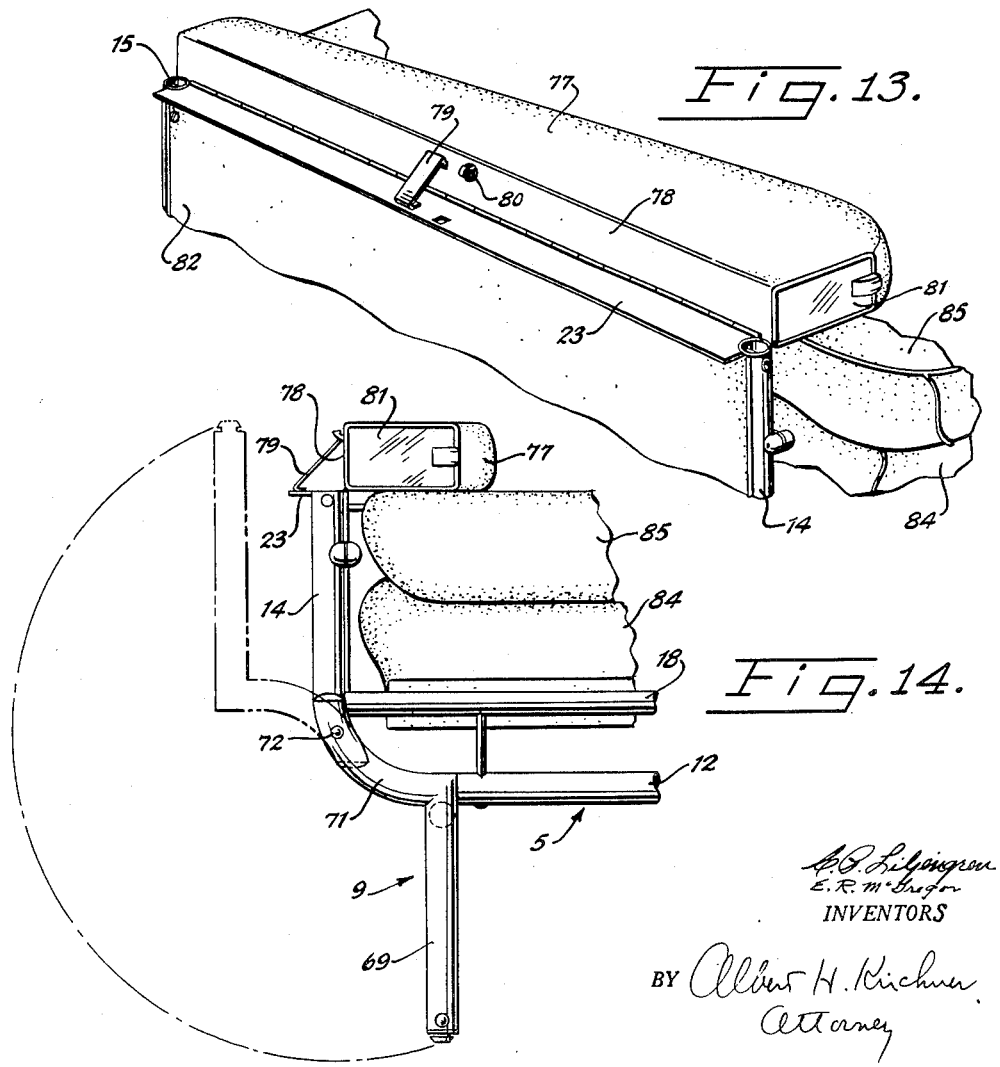

April 6, 1954  C. P. LILJENGREN ET AL  2,674,300
UPENDING SEAT CONSTRUCTION FOR VEHICLES
Filed Sept. 2, 1948  8 Sheets-Sheet 8

C. P. Liljengren
E. R. McGregor
INVENTORS

BY Albert H. Kirchner
Attorney

Patented Apr. 6, 1954

2,674,300

UNITED STATES PATENT OFFICE 2,674,300

UPENDING SEAT CONSTRUCTION FOR VEHICLES

Curtis P. Liljengren, Miami Springs, and Eugene R. McGregor, Miami, Fla., assignors to Flight Equipment and Engineering Corp., Miami, Fla., a corporation of Florida Application September 2, 1948, Serial No. 47,486

13 Claims. (Cl. 155—5)

The present invention relates to seats per se and to seat mountings and seating arrangements especially adapted to be used in vehicle interiors, which may, by way of example but not limitation, be the cabins of airplanes where it is desirable to convert the vehicle from passenger to freight service by disposing the seats selectively in operative or stowed position.

An important feature of the invention is the provision of a strong, lightweight, practical seat construction which will in one position comfortably and safely accommodate a passenger and which can be readily folded compactly into small compass and stowed securely against a side wall of the vehicle.

The structures disclosed and claimed in this application are related to and constitute improvements over the construction which forms the subject of our copending application Serial No. 751,840, filed June 2, 1947, now Patent #2,523,960.

While the structures proposed by the invention are capable of being installed to advantage in vehicles generally, or even in fixed buildings, the preferred embodiments which have been selected to illustrate the invention were designed especially for airplane use and have certain advantages in such use and it will be convenient therefore to explain the inventive principles in terms of such embodiments and use. But such explanation is not to be considered as limiting the application of the principles, or the scope of the invention, to the particular details, purposes or uses herein described. Reference is made to the appended claims for definitions of the broad scope of the invention.

A general object of the invention, in the embodiments intended for airplane and analogous service, is to provide a foldable seat structure with cargo hold down means or fittings which will be exposed in operative position when the seat is stowed and which will afford secure and stable anchorage fixtures for affixing ropes, straps and the like which are required to be tied to and over the lading to prevent its shifting.

Another object is to make the seat foldable to a form or condition in which its upholstered surfaces will be well protected from contact with the enclosing structure of the vehicle or the like, such as the airplane cabin side wall, and from contact with cargo which may be crowded between the stowed seats.

A related object is to provide a seat which, when stowed in folded condition, will effectively protect the side wall, or other surface against which it is stowed, from damage that might result from contact by the cargo.

A further object is to incorporate all the foregoing and other advantages and features in a structure which may be mounted interchangeably on either side of a vehicle, with the two sides of the structure disposable equally well at the aisle or side wall, so that the making of special rights and lefts is avoided, and so that a single style of replacement structure can be substituted anywhere in an installation.

A general object of the invention is to make the structure simple and foolproof so that it can be operated rapidly by unskilled persons and will include relatively few parts all of which can be made rugged for a long life of satisfactory use.

Other objects are concerned with important structural details of the seat per se, such as the relationship of its base, back and seat proper, all of which will sufficiently appear as the preferred embodiments are explained hereinafter in this specification.

A particular object of the present improvement is to mount the assembly for a compound pivotal movement between operative and stowed positions so that these movements will be largely counterbalanced and can be made with a minimum of effort and a maximum of convenience and with the assembly in its stowed position occupying a minimum of head room so as to fit beneath upper side wall appurtenances, such as a baggage rack.

A related object is to provide the assembly with downfoldable armrests for overlying downfolded seat backs to produce a locked stack of minimum height and consequently of minimum lateral thickness when stowed against the side wall of the airplane cabin or the like.

Another object is to provide a seat back in two parts, with the upper part foldable down onto the seat cushion about the line of separation between the upper and lower parts, which is at the level of the line about which the armrests fold, thus enhancing the compactness of the folded assembly.

Other objects are to provide various latching means for selectively holding the several parts in extended, operative relation and for releasing them for movement to folded position and then holding them in folded relation.

Another object is to incorporate adjustable reclining features in a seat and seat back combination of the type described.

Important features of the invention are ready interchangeability and replaceability of many of the parts, including especially the mounting elements, so that whenever desired a stowable installation can be converted into a nonstowable one, and vice versa.

In the accompanying drawings, which form part of this application for letters patent and which show certain preferred embodiments of the invention installed in an aircraft cabin, Figure 1 is a perspective view of a twin seat unit disposed in extended, operative position in the cabin;

Fig. 3 is a perspective view of the framework structures, illustrating the manner in which folding from extended, operative position is begun;

Fig. 4 is a detail perspective view of the front outboard corner of the framework of Fig. 3, with certain of the operating parts shown separated so as better to illustrate their individual shapes;

Fig. 5 is a detail sectional view of the seat bottom frame supporting and adjustment latching means shown in Fig. 4;

Fig. 6 is a similar view of the seat bottom frame front supporting means, unprovided with a latching device, as used adjacent to the meeting edges of the twin seats in Fig. 3;

Fig. 7 is a detail side elevational view of the seat bottom and back frame connections showing in broken lines the manner in which the upper seat back frame folds down onto the seat bottom frame, with space allowed for the seat and back cushions (which are not shown);

Fig. 8 is a perspective view of the seat bottom and back frames showing the mode of connection to the basic fixed frame structure;

Fig. 9 is a detail perspective view of the latching joint which connects the upper back frame to the lower back frame;

Fig. 12 is a perspective view of an inboard armrest in elevated, operative position;

Fig. 13 is a similar view showing the armrest latched down in folded position;

Fig. 14 is a detail front elevational view of the inboard side of an installation with the parts folded preparatory to stowing and with the inboard leg assembly shown in broken lines elevated to its stowing position;

Figure 1:
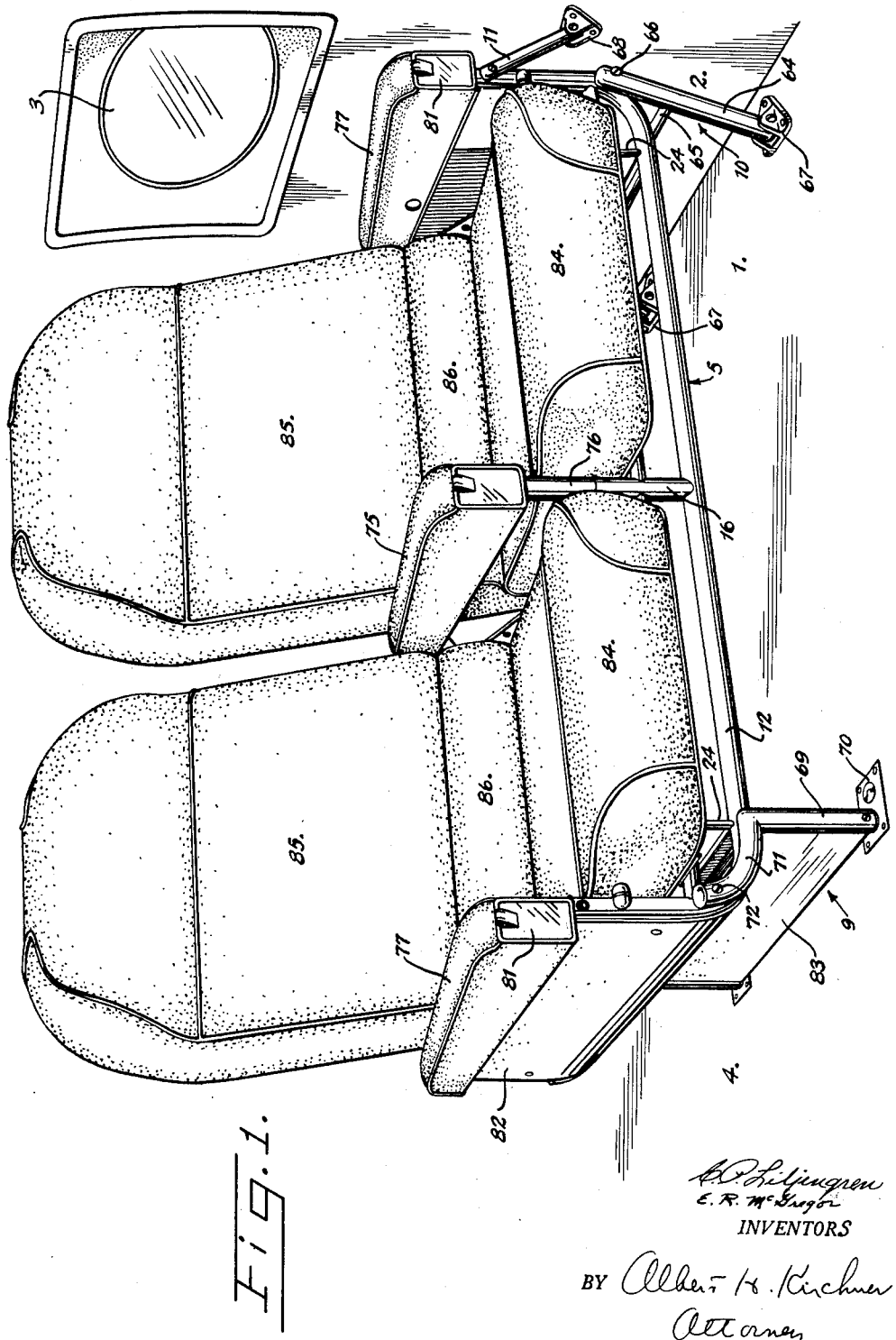

Generally speaking, the invention, as incorporated in the specific preferred embodiments shown in the drawings, comprises a main base frame which is supported at its inboard side by a foldable leg detachably mounted on the cabin floor and at its outboard side by links and legs pivoted to the side wall and floor for guiding the assembly through movement about a moving pivot axis when it is swung between operative and stowed positions; this base frame mounts longitudinally adjustable seat bottom frames and tiltable seat back frames which are foldable together beneath downfolding armrests; and upper side wall fittings are provided for receiving the inboard legs when the assemblies are folded against the side wall.

Such a construction may within the principles of the invention be embodied in a single seat unit or in a pair or more of adjacent seats integrally connected as a single unit. A twin seat unit is preferred and is depicted by the drawings which will now be described in detail.

In the drawings, the reference numeral 1 designates the floor of the cabin of an airplane having a side wall 2 provided with windows 3 and having a center aisle area 4. The seat construction which constitutes the present invention is disposed in operative position on the floor between the aisle and side wall and is mounted on the floor and side wall for folding to inoperative position against the side wall, as will be evident from a comparison of Figs. 1 and 2, or Figs. 10 and 11.

Figure 2:
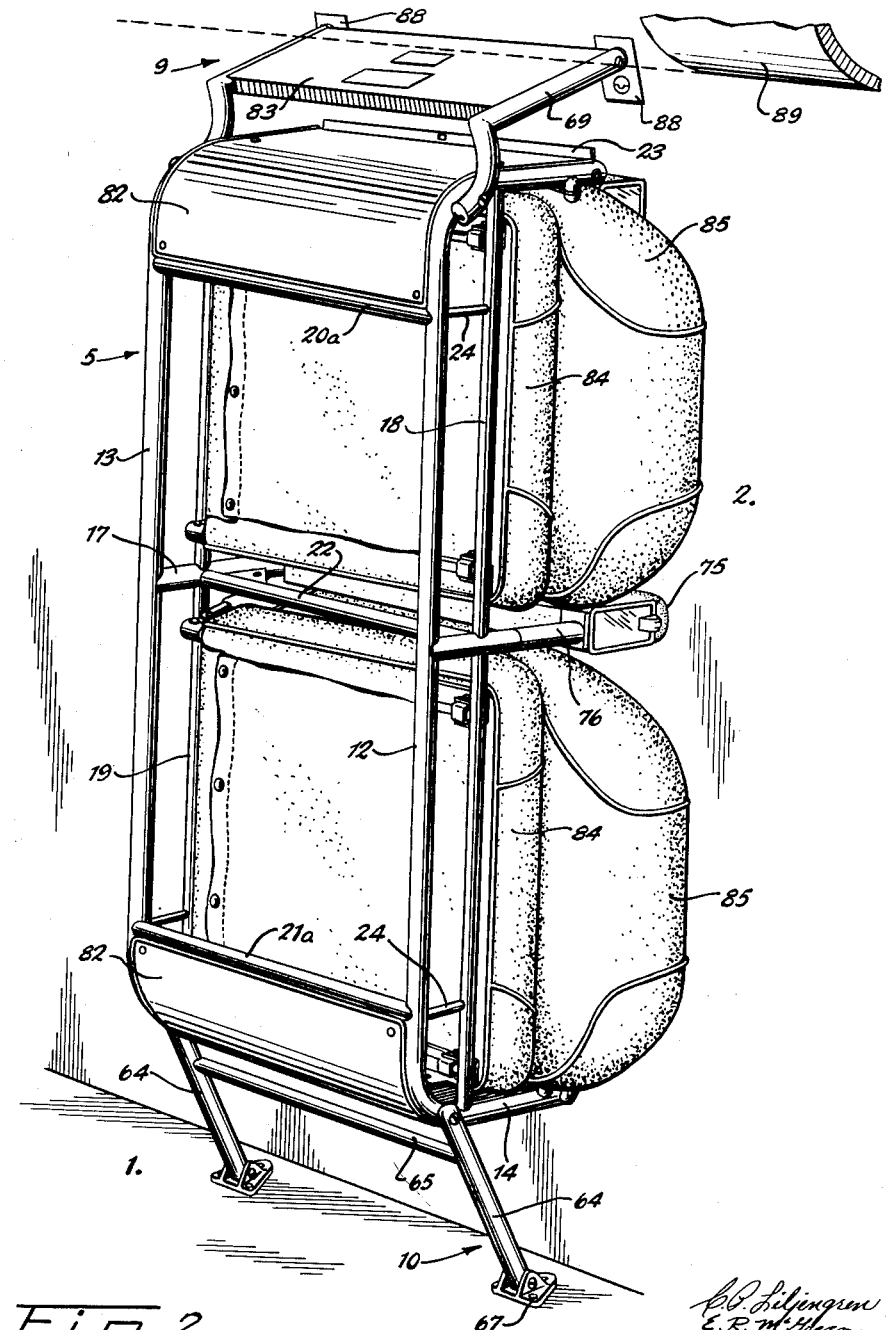
Fig. 2 is a perspective view of the same installation shown in folded, vertical position stowed against the cabin side wall.

The seat construction comprises principally a main base frame 5 which is swingable to fixed horizontal, operative and fixed vertical, inoperative positions, as shown in Figs. 3 and 2 respectively, a seat bottom frame 6 (shown double, as a pair of frames), which is slidable fore and aft or longitudinally on the frame 5, a lower seat back frame 7, which is pivoted at its bottom to the seat bottom frame and at its top to an upstanding part of the main base frame, an upper seat back frame 8, which is hinged at its bottom to the top of the lower seat back frame for folding down onto the seat bottom frame, an inboard leg assembly 9, which is pivoted to the inboard side of the main base frame, an outboard leg assembly 10, which is pivoted to the outboard side of the main base frame, and a pair of vertical displacement links 11 which are pivoted at their ends to the side wall and to the upper portion of the outboard side of the main base frame. In addition to the foregoing main framing structure, most of which is best made of lightweight metal tubing, the complete construction includes bottom and back cushions, side paneling, armrest elements, floor and side wall mounting fittings, various connecting elements and fastenings, operational actuators, etc., all of which will be referred to and explained in the detailed description which will now be given.

The main base frame 5 comprises a lower front cross member 12, and a lower rear cross member 13, which are parallel and are horizontal in the operative position of the seat shown in Fig. 3, which will be used as the basic figure for designating the horizontal and vertical. The ends of these cross members are turned right-angularly up to form vertical front side posts 14 and vertical rear side posts 15, and to the centers of the respective cross members there are welded a relatively low vertical front center post 16 and a vertical rear center post 17, which is as high as the side posts 14 and 15. Each post 14 is connected with the post 16 by an upper front cross member 18, and each post 15 is connected with the post 17 by an upper rear cross member 19. In substantially the horizontal plane of these upper cross members the posts 14 and 15 are connected at the inboard side by an inboard lower side member 20 and at the outboard side by an outboard lower side member 21, and the posts 16 and 17 are similarly connected by a center fore and aft or longitudinal member 22. Additional lower side members 20a and 21a may be used to connect the lower front and rear cross members 12 and 13 at the inboard and outboard sides, respectively, of the frame. The members 20, 21 and 22 may be gusseted to the rear posts 15 and 17, respectively, as shown, to enhance the rigidity of the main base frame. The posts 14 and 15 at each side of the structure are connected by an upper side member 23 which has a flat upper horizontal surface, in order to function as an armrest support, and is thus best made of angle or T-shaped stock, as is best shown in Fig. 4. Short struts 24 connect the lower and upper front cross members 12 and 18, and the lower and upper rear cross members 13 and 19, to cooperate with the gussets and other connections, which are preferably all welded, to make the main base frame highly rigid and strong despite its light weight and the open or skeleton character of its construction.

It will be noted that the main base frame is symmetrical from side to side so that it can be positioned interchangeably at either side of the aisle 4, with either of its sides adjacent to the side wall 2. As will be seen hereinafter, the specially constructed supports, which are different at the outboard and inboard sides of the frame, are interchangeable at the two sides. In this way the making of special right and left main base frames is avoided, and manufacture, maintenance and replacement are all simplified, with considerable resulting economy.

Each seat bottom frame 6, two of which are set side by side on the main base frame 5 in the preferred embodiment of the invention, comprises a front cross member 25 bent back right angularly at its ends to form a pair of fore and aft or longitudinal side members 26 which are connected together just short of their rear ends by a rear cross member 27, thus providing a rigidly rectangular seat bottom frame which is mounted for limited sliding movement longitudinally of the main base frame by fittings which will be hereinafter explained. First, however, it seems appropriate to describe the seat back frame parts and their connections to each other and to the seat bottom frame.

Each lower seat back frame 7 comprises a pair of more or less vertical uprights 28, one at each side of the seat back, connected by a lower seat back frame cross member 29, and each having its lower end connected to the rearwardly extending end of the adjacent side member 26 of the seat bottom frame 6 by a hinge fitting 30, which, as is best shown in Fig. 8, may take the form of pin-connected plate elements plugged into or sleeved over the adjacent tubular ends of the members 26 and 28 of the seat bottom frame 6 and of the lower seat back frame 7, respectively.

Each upper seat back frame 8 comprises a generally U-shaped length of tubing providing an upper bight 31 and a pair of substantially parallel side members 32 the bottoms of which are connected to the adjacent vertical uprights 28 of the lower seat back frame 7 by the hinge fittings 33 which are shown in detail in Fig. 9. As there illustrated, each of these fittings may include a pair of plugs fastened in the tubular ends of the respective members 28 and 32, with each plug welded to one of the leaves of a plate type hinge. The pin 34 of this hinge is a machine bolt which is set through an opening in the adjacent main base frame vertical rear side post 15 (in the case of the extreme inboard and outboard hinge fittings 33) or through an opening in the adjacent main base frame vertical rear center post 17 (in the case of the two interior hinge fittings 33), all as best shown in Fig. 8. The arrangement is such that the upper seat back frames 8 may be pivoted down forwardly about the hinge pins 34 into or even beyond parallelism with the seat bottom frames 6 but are prevented, by mutual abutment of the leaves of the hinges 33, from being swung backwardly beyond alignment of the members 28 and 32. Thus in operative position the upper and lower seat back frames 8 and 7 form in effect a single, continuous seat back frame, while in inoperative position they are foldable along a line dividing the effectively single frame into two parts as will be evident from a comparison of the two positions in which the seat frames of Fig. 3 are shown, the frame at the left being in operative position and that at the right being in a position intermediate between operative and inoperative positions.

A latch 35 may be provided to keep the upper and lower seat back frames 8 and 7 aligned. As shown in Fig. 9, this latch may comprise a hook 36 pivoted on the upper leaf of the hinge fitting 33 and provided with a camming nose and spring operated so that when the members 28 and 32 are swung into alignment the hook will close over the edge of the lower leaf of the hinge fitting and hold the two leaves against angular separation. A cable 37, trained about the side members 32 of each upper seat back frame, connects the hooks 36 of the two latches 35 of the seat with an operating handle 38 located in the bight 31, so that pull on the handle will release the two latches of the seat and permit the upper seat back frame 8 to be folded forwardly down onto the seat bottom frame 6, as shown in broken lines in Fig. 7.

It will be evident from what has thus far been explained that the seat bottom frame 6 is supported at its rear on the main base frame 5 through the medium of the hinge fittings 30, the uprights 28, and the hinge pins 34, which latter are set through openings in the posts 15 and 17, which of course are parts of the main base frame, all as best shown in Figs. 3 and 8. The seat bottom frame 6 is supported at its front on the main base frame 5 by the structure best shown in Figs. 3, 4, 5 and 6, which will now be described.

Each upper front cross member 18 of the main base frame 5 is provided with a pair of roller mounting assemblies, one designated 39 and shown in detail in Fig. 6 being located adjacent to the vertical front center post 16, and the other designated 40 and shown in detail in Fig. 5 being located adjacent to the vertical front side post 14. These two assemblies are generally similar, as are the respectively cooperating bearing or shoe assemblies, designated 41 and 42, respectively, for the assemblies 39 and 40, carried by the side members 26 of the seat bottom frame 6 by which those side members are supported on the rollers of the assemblies 39 and 40, except that the exterior assembly 42 is provided with fore and aft position adjusting means. Accordingly, identical elements in the several assemblies will be designated by the same reference numerals.

Referring first to Fig. 6, the roller mounting assembly 39 comprises a pair of spaced parallel bracket plates 43 welded to the back of the upper front cross member 18 of the main base frame 5 and projecting rearwardly therefrom in vertical planes. These plates are perforated to form a bearing for a bolt 44 on which is journalled a roller 45 mounted between the upstanding side legs of a channel shaped roller box 46, through registering openings in which legs the bolt passes. One of these legs is vertically extended above the common level of the other flange and of the roller and is provided with a flange 47 right-angularly inturned in spaced relation over the roller.

The cooperating bearing or shoe assembly 41 comprises a channel element 48 welded and/or bolted to the adjacent side member 26 of the seat bottom frame 6 and projecting therefrom toward the interior of the seat bottom frame so as to give a box-shaped enlargement to the member 26. Welded to the bottom leg of the channel element 48 is the upper leg of a lower horizontal channel element 49, the bottom leg 50 of which rests directly on the roller 45 and rides on the roller in the manner of a shoe or movable rail. The fit of the shoe 50 on the roller is under the overhanging flange 47 of the roller box 46, so that the shoe assembly 41 is kept captive on the roller mounting assembly 39, which means of course that the seat bottom frame 6 is kept from being lifted off the main base frame 5. It will be evident, however, that the seat bottom frame can be adjusted longitudinally, or fore and aft, along the main base frame by sliding of the shoe 50 on the roller 45.

As is indicated by the identity of reference numerals in Figs. 5 and 6, the assemblies 40 and 42 are generally similar to the assemblies 39 and 41, respectively. The sole difference is in certain details by which the Fig. 5 construction includes means for latching the assembly 42 in longitudinally adjusted positions on the assembly, which of course results in adjustably fixing the fore and aft position of the seat bottom frame 6 on the main base frame 5.

Referring now to Fig. 5, this seat position latching means comprises forming on the upper leg of the lower horizontal channel element 49 a right-angularly downturned flange 51 which is parallel to the vertical web or base of the element 49 and which is serrated so as to have a series of indentations 52, as shown in Fig. 4.

Still referring to Fig. 5, a bolt 53 occupies the position of the bolt 44 in the assembly 39 of Fig. 6 and is sufficiently longer than the bolt 44 to journal one end of a link 54 outwardly beyond the roller box 46. The other end of this link is pivoted to a pin journaled in a housing 55 which is built up by welding on a stirrup 56, which is integral with the lower end of a more or less vertical arm 57. This arm is confined loosely within a guide 58 welded to the outboard lower side member 21 of the main base frame 5, and its upper end hangs pivotally from a first order lever 59 which is fulcrumed intermediately at 60 to a bracket 61 rearwardly projecting from the outboard vertical front side post 14 of the main base frame 5. The end of the lever, behind its connection with the arm 57, is tensioned upwardly by a coil spring 62 so as to depress the front end of the lever. This front end projects out beyond the post 14 and is provided with a knob or handle 63, which is kept down by the spring 62 so that the pin 55 at the bottom of the arm 57 is kept elevated into that one of the indentations 52 of the channel element flange 51 which happens, in any longitudinally adjusted position of the seat bottom frame, to be directly over the pin.

It will be evident that this arrangement latches the seat bottom frame in longitudinally adjusted positions and permits it to be released for readjustment by lifting the knob or handle 63 and sliding the seat bottom frame forward or backward, which movement (of the shoes 50 on the rollers 45) is made possible by the resulting lowering of the pin 55 out of engagement with the serrations of the flange 51.

The outboard leg assembly 10 comprises front and rear leg members 64 connected intermediately by a longitudinal member 65 and having their upper ends pivoted at 66 to the turns in the main base frame 5 at which the outboard side posts 14 and 15 rise from the lower cross members 12 and 13 respectively. The lower ends of these leg members are more or less permanently pivoted to floor fittings 67 so located with relation to the lengths of the leg members that when the main base frame 5 (and consequently the seat bottom frames 6 also) are horizontally disposed, as shown in Figs. 1 and 3, the leg members will be upwardly and outwardly inclined at a considerable angle, so as to position the extreme outboard surfaces of the outboard posts 14 and 15, of the paneling which trims them, and of the armrest hereinafter to be described which surmounts the outboard upper side member 23, all close to the cabin side wall 2, which is commonly outwardly bulged or curved. In this way minimum lateral space is occupied by the seats and maximum center aisle space 4 is provided between opposed seats or pairs of seats.

The desired angularity of the leg members 64 is predetermined and fixed by the length of the pair of links 11 and by the points of their connection to the main base frame 5 and to the cabin side wall 2. As shown, particularly in Figs. 1 and 3, these links are pivoted, at one end of each, to the tops of the outboard posts 14 and 15, and at the other end of each to fittings 68 so located on the cabin side wall 2 that when the seats are in horizontal, operative position the links will be outwardly and downwardly inclined at a sharp angle. The purpose of this type of mounting will be presently explained.

The inboard leg assembly 9 comprises specially shaped front and rear leg members each consisting of a lower post 69 which is vertical when its bottom is mounted in a fitting 70 set in the cabin floor just outside the aisle 4, which post is surmounted by an upper portion 71 which is upwardly and inwardly arcuately curved in general conformity to the curvature by which the main frame lower cross members 12 and 13 merge into the posts 14 and 15 respectively, and the upper ends of these upper portions 71 are pivoted at 72 to the bottoms of the posts 14 and 15, respectively, all as shown in Figs. 1 and 3. The two lower posts 69 of the inboard leg assembly 9 are connected by a longitudinal member 73, and the center of the latter member is directly connected with the lower part of each lower post 69 by a diagonal brace 74.

As will be evident from Fig. 3, the pivot points 66 and 72 are located at points of equal elevation on the front of the main base frame 5. The corresponding pivot points at the rear are similarly located. As appears at the right hand side of Fig. 3, the post 14, which is there shown in the inboard location and hence has no link 11 connected to it, has a drilled opening near its top into which a pivot bolt for a link can be installed if the assembly were to be placed at the opposite side of the aisle 4. The rear post 15 at the inboard side is similarly drilled. In this way the adaptability of the single main base frame structure to placement at either side of the cabin is completed.

The floor fittings 70 are socketed so as detachably to receive and hold the necks of lugs projecting from the leg posts 69, and the location of these fittings relatively to the locations of the fittings 67 and 68 is such that when the leg posts 69 are engaged in the fittings 70 the seat structure will be positioned closely up against the cabin side wall 2 and the outboard leg members 64 and the links 11 will be disposed at the angles which have been described and which are shown in Figs. 1 and 3 and the whole structure will be very securely maintained against longitudinal or lateral movement. As will be explained hereinafter, the novel mounting provided for the seat in its horizontal position by the angular disposition of the outboard supporting elements 64 and 11 provides a new kind of movement, and is productive of new advantages, when the seat is swung upwardly to inoperative or stowed position, but it seems appropriate first to complete the explanation by describing the rest of the parts and the manner in which they are operated to condition the structure to be swung to the stowed position shown in Fig. 2.

An upholstered central armrest 75, as shown in Fig. 1, has depending from its front end portion a mounting post 76 provided with a reduced projection which is telescoped into and more or less permanently secured in the front center post 16 of the main base frame 5. A similar reduced projection (not shown) depends from the rear end portion of the armrest and is fixed in the rear center post 17 of the main base frame. Thus the single central armrest 75 fits between and serves the twin seats of which the two seat bottom frames 6 of Fig. 3 form the foundation.

The two end armrests 77 of the pair of seats are also upholstered box-like members. Each, however, has its bottom plate 78 (Fig. 13) hinged along its inside edge to the inside edge of one of the upper side members 23 of the main base frame 5 so that these two armrests may stand upright, in operative position, on the members 23, as shown in Fig. 12, or may be turned rightangularly inwardly therefrom to extend over the adjacent margins of the backs, as shown in Figs. 13 and 14. Some such device as the leaf spring 79, which is fastened to one of the members 23 or 78 and snaps out of an opening in the other member, may be used to hold each armrest 77 in downturned position, and some such means as the catch 80 on one of the members and its cooperating keeper on the other member may be provided to latch the armrest in upright position.

Any or all of the armrests may be equipped with ashtrays 81 of the familiar type widely used in automobile interiors.

Decorative and protective panel trimming 82 may be secured to the exterior sides of the main base frame 5 between the posts 14 and 15, and similar trimming 83 to the inboard leg assembly 9 between the lower posts 69 of the front and rear leg members.

An upholstered seat bottom cushion 84 is fastened on each seat bottom frame 6, and similar cushions 85 and 86 are mounted on the upper and lower seat back frames 8 and 7, respectively. Conventional webbing, like that shown at 87 in the upper seat back frame in Fig. 3, may be employed for mounting each of these cushions.

Figure 10:
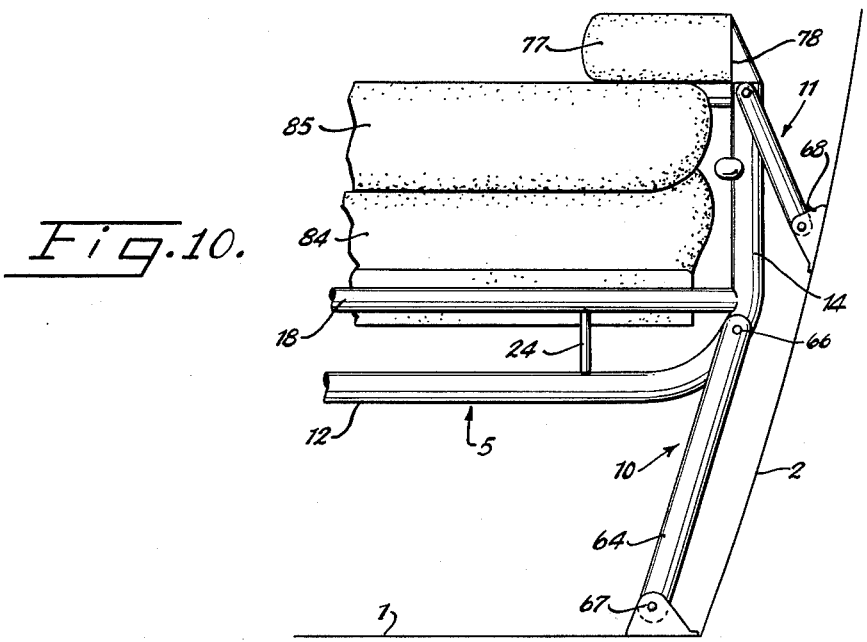
Fig. 10 is a front elevational view of the outboard side of an installation showing the parts folded into position for swinging the assembly to stowed position.
Figure 11:
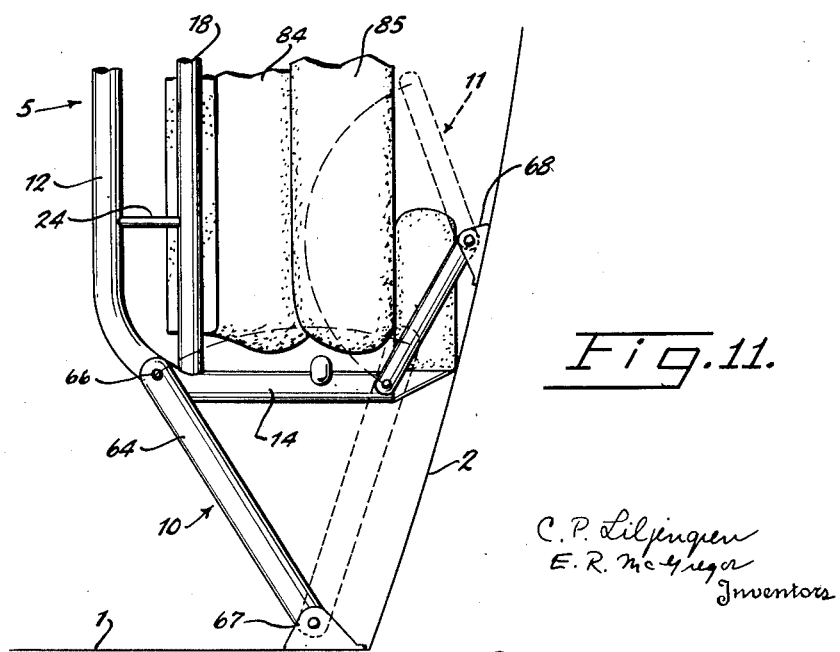
Fig. 11 is a similar view showing the assembly in stowed position.

The principal basic structure having been described, the mode of operation, to swing the seat assembly from horizontal, operative position to vertical, stowed position, is as follows:

Assuming the twin seat structure is in the horizontal, operative position to which the description has been directed and which is shown in Fig. 1, the handles 38 of the two backs are pulled to release the latches 35, whereupon the upper seat back frames are swung forwardly down toward the seat bottom frames until the cushions 85 and 84 of these two parts are brought snugly into engagement with each other. Then the catch 80 of each of the two end armrests 77 is released and the two armrests are turned over onto the folded down seat backs, as shown in Figs. 10, 13 and 14, until the springs 79 snap into the position shown in Fig. 13, thus holding the bottom, back and armrest elements securely together in stacked relation.

The inboard leg assembly 9 is released from the floor fittings 70 and swung around on the pivots 72 to the position shown in broken lines in Fig. 14. Then the entire assembly is swung to the vertical, stowed position shown in Fig. 2, and the lower posts 69 of the inboard leg assembly are snapped into upper side wall fittings 88 which are like the floor fittings 70. In this swinging movement the outboard leg members 64 and the links 11 move inwardly and downwardly from their Fig. 10 position to their Fig. 11 position, thus substantially lowering the entire assembly and bringing it to a stop close to the floor and close to the side wall.

It will be noted that this lowering of the outboard side of the assembly largely counterbalances the weight of the inboard side which must be lifted in the operation of swinging from horizontal to vertical positions. Conversely, when the structure is swung back down to horizontal position the weight of the lowering inboard side is largely offset by the rising of the outboard side. The effort required in both operations is thus reduced, as is also the tendency of the parts to swing free and get out of control.

This lowering component in the movement also gives the stowed position of the assembly the maximum top clearance which is one of the important objects of the invention and enables the assembly to be stowed beneath such upper side wall structures as the baggage rack shown at 89 in Fig. 2.

Restoration to operative, horizontal position is accomplished by a reverse of the foregoing operations, as will be evident.

Figure 15:
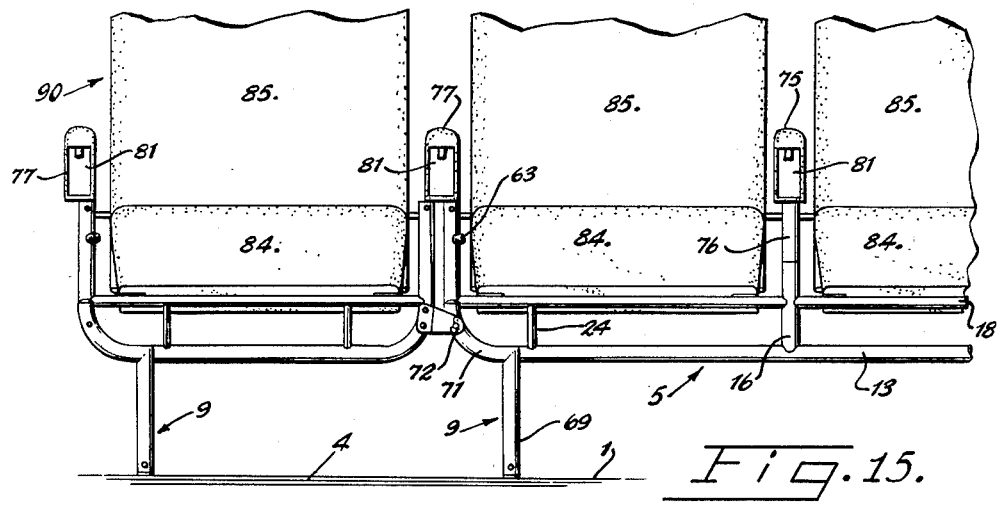
Fig. 15 is a front elevational view of an installation with an auxiliary seat shown attached.
Figure 16:
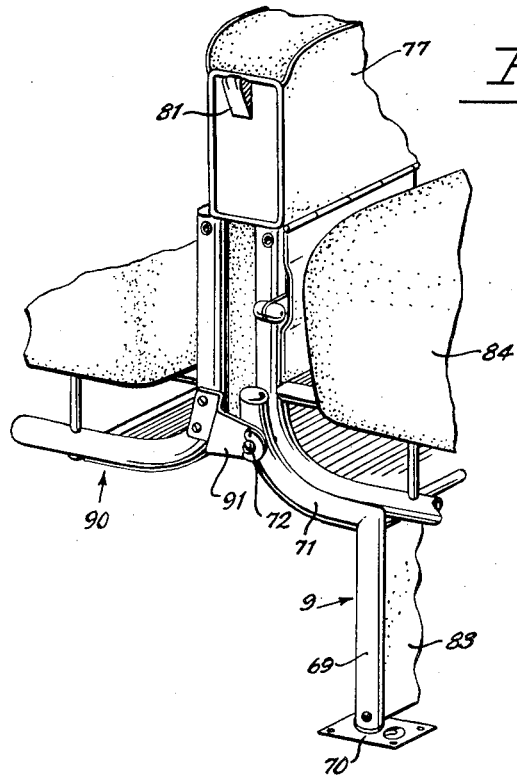
Fig. 16 is a perspective detail view of the connection between the basic installation and the auxiliary seat.
Figure 17:
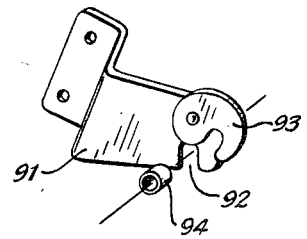
Fig. 17 is a perspective view of the connecting clip shown in Figs. 15 and 16.

Figs. 15, 16 and 17 show an arrangement by which a third seat 90 may, if desired, be mounted in the aisle 4 and attached to the inboard seat of the pair of the basic construction. This auxiliary seat is provided with an inboard leg assembly 9 and is in all other respects generally like the construction of the seats already described except that it has no outboard legs of any kind. Instead, the outboard front and rear posts 14 and 15 of its main base frame are each provided with a clip, which may take the form shown in detail in Fig. 17, for making readily attachable and detachable connection to the bolt 72 about which the inboard leg assembly 9 of the adjacent seat pivots. As shown, the clip comprises a plate 91 projecting from the auxiliary seat and provided with a slot 92 for fitting over the bolt 72. A slotted locking finger 93 is pivoted to the plate to have the effect of opening and closing the slot 92 so as to release or embrace the bolt or a bushing 94 sleeved over it. When mounted, as shown in Figs. 15 and 16, the outboard posts of the main base frame of the auxiliary seat are covered by the inboard side armrest 77 of the adjacent seat. The opposite side of the auxiliary seat is provided with its own foldable armrest 77. The auxiliary seat is stowed by detaching it, folding its back, armrest and leg assembly in the manner heretofore described in the explanation of the corresponding parts of the main seats, and then removing the auxiliary seat for stacking or stowing in any convenient place in the cabin or elsewhere in the airplane. It is of course possible to tie the auxiliary seat to the vertically disposed members 12 and 13 of the stowed main seats shown exposed for cargo tying in Fig. 2.

In the stowed position of the structure, the main base frame members 12, 13 and 22 provide convenient anchorages for tying cargo holddown straps, ropes and the like, as in the construction which is the subject of our copending application.

It is believed that the manner in which the present improved construction achieves the objects and incorporates the advantages summarized at the beginning of this specification will now be evident. It may be noted in conclusion that not all of the structural features which have been described need be used conjointly in any given embodiment and that various changes in detail may be made without departing from the spirit of the invention as defined by the appended claims. Thus, for example, the center armrest 75, which is shown nonfoldable because the customary outward bulge or curvature of most airplane cabin side walls is ample to accommodate an upright center armrest, may be made foldable like the side armrests 77 if desired or found necessary. Similarly, the various latching devices may be modified, or changed in position, or in some cases omitted, although we have found in actual practice that the devices as herein disclosed are eminently satisfactory and hence like all the other details of the disclosed embodiments are preferred.

We claim:

1. A foldable seat for a vehicle having a side wall and a floor comprising a seat base normally disposed in horizontal operative position and having at one side a pivotally connected leg member hinged to the floor and a pivotally connected link member hinged to the wall for constraining said side of the base when swung about said members to move away from the wall and down and back toward the wall, and means at the opposite side of the base for supporting the same on the floor, said link member being upwardly inclined from its hinge connection with the wall to its pivotal connection with the seat base when the seat base is in operative position.

2. The combination claimed in claim 1, including a seat bottom mounted on the seat base, a seat back connected to the bottom and foldable down onto the bottom, and an armrest mounted on the seat base and foldable down onto the folded seat back.

3. The combination claimed in claim 1, including a seat bottom mounted on the seat base, a seat back connected to the bottom and foldable down onto the bottom, an armrest mounted on the seat base and foldable down onto the folded seat back, and means latching the armrest in its folded position so as to hold the base, bottom, back and armrest superposed in a compact stack for folding into close juxtaposition to said side wall.

4. A seat for a vehicle having a side wall and a floor comprising a seat base having at its inboard side a leg member movable between seat base supporting position and upwardly folded position and having at its outboard side a leg member pivoted at its opposite ends to the base and to the floor, in combination with link means pivoted to the wall and to the base above the outboard leg member to constrain the inboard side of the base to swing away from the wall and then down and back toward the wall when the inboard leg member is moved to upwardly folded position and the inboard side of the base is swung upwardly, said link means being upwardly inclined from the wall to the base when the base is in operative position.

5. The combination claimed in claim 4, including fitting means on the side wall above the link means for releasably holding the folded inboard leg member when the base is swung toward the side wall.

6. The combination claimed in claim 4, in which the two leg members are interchangeably connectible to either side of the base.

7. A seat comprising a base frame, a lower back frame pivoted to the base frame, a seat bottom frame pivotally hung from the lower back frame, an upper back frame hinged to the top of the lower back frame and foldable down onto the seat bottom frame, and an armrest hinged to the base frame and foldable down onto the folded down upper back frame to hold said frame superposed in stacked relation on the seat bottom frame.

8. A folding seat construction comprising a seat bottom, a seat back hinged thereto for folding down on the seat bottom, an armrest mounted adjacent to a side of the seat bottom and foldable laterally down onto the seat back when the seat back is folded down on the seat bottom, and manually releasable means cooperating with the armrest and its mounting for holding the armrest down on the seat back.

9. A seat for a vehicle as claimed in claim 1, including a lower back frame pivoted to the base, a seat bottom frame pivotally hung from the lower back frame, an upper back frame hinged to the top of the lower back frame and foldable down onto the seat bottom frame, and an armrest hinged to the base and foldable down onto the folded down upper back frame to hold said frame superposed in stacked relation on the seat bottom frame, and fitting means mounted on the vehicle side wall for releasably engaging the seat and thereby holding the seat parts in said stacked relation releasably stowed in close juxtaposition to said wall.

10. A seat for a vehicle having a side wall and a floor comprising a seat base frame having at its inboard side a leg member movable between seat base frame supporting position and upwardly folded position and having at its outboard side a leg member pivoted at its opposite ends to the base frame and to the floor, in combination with link means having one end pivoted to the wall and normally extending at an upward inclination to a pivotal connection with the base frame for assisting in holding the frame in horizontal operative position and being movable to substantially horizontal position, accompanied by inward swinging of the outboard leg member, when the inboard leg member is moved to upwardly folded position, to assist in supporting the seat base frame in lowered, vertically stowed position in close proximity to the side wall.

11. In a seat construction for a vehicle having a floor and a side wall, means for supporting a seat for movement between a horizontal, operative position closely adjacent the side wall and a vertical, stowed position in which the seat is closely adjacent the side wall and an end of the seat is lowered toward the floor, said means comprising a leg having its opposite ends pivoted respectively to the floor and the seat and inclined toward the side wall when the seat is in horizontal position and a link having its opposite ends pivoted respectively to the side wall and the seat and inclined away from the side wall and toward the seat when the seat is in horizontal position, and leg means spaced from said leg and link supporting the seat on the floor and releasable to free the seat for swinging movement about the pivotal connections of said leg and link to vertical position with the link substantially horizontal and with the leg inclined away from the side wall.

12. A folding seat construction comprising a seat frame, a seat back hinged to the rear of the frame for folding down thereon, armrest supporting members fixed at the sides of the frame, an armrest member hinged to each of said supporting members for folding down on the folded seat back, means releasably holding the armrest members upright on said supporting members, and releasable means carried by one of the members and adapted to snap into position against the other member for holding the armrests in folded position on the seat back.

13. A folding seat construction comprising a seat frame, a seat back hinged to the rear of the frame for folding down thereon, armrest supporting members fixed at the sides of the frame, an armrest hinged to each of said members for folding down on the folded seat back, means releasably holding the armrests upright on said members, and releasable means interposed between the members and the armrests adapted to snap into position for holding the armrests in folded position on the seat back, said releasable means comprising a spring element secured to each of the members, insertible into an opening in the adjacent armrest when the armrest is in upright position and bearing against the armrest when the armrest is folded down on the seat back.

References Cited in the file of this patent

UNITED STATES PATENTS

| Number | Name | Date |
|---|---|---|
| 360,729 | Roberts | Apr. 5, 1887 |
| 364,944 | Littlefield | June 14, 1887 |
| 1,050,362 | Hansen | Jan. 14, 1913 |
| 1,325,218 | Uptegrove | Dec. 16, 1919 |
| 1,896,048 | Grinnell | Jan. 31, 1933 |
| 2,047,682 | Grinnell | July 14, 1936 |
| 2,116,366 | Scott | May 3, 1938 |
| 2,396,039 | Burton et al. | Mar. 5, 1946 |
| 2,453,027 | Marks | Nov. 2, 1948 |
| 2,462,377 | Flinn | Feb. 22, 1949 |
| 2,523,960 | Liljengren et al. | Sept. 26, 1950 |